United States Patent
Golovoy et al.

(10) Patent No.: US 6,479,010 B1
(45) Date of Patent: *Nov. 12, 2002

(54) METHOD OF BLOW MOLDING AN ARTICLE HAVING BLOW MOLDED VERTICAL REINFORCEMENT RIBS

(75) Inventors: Angela Renee Golovoy, Royal Oak, MI (US); Kurtis Zetouna, Waterford, MI (US)

(73) Assignee: Visteon Global Technologies, Inc., Dearborn, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/072,796

(22) Filed: May 5, 1998

(51) Int. Cl.⁷ .................................................. B29C 49/54
(52) U.S. Cl. ....................... 264/534; 264/531; 264/318; 425/525; 425/DIG. 58
(58) Field of Search ................... 264/531, 534, 264/318; 425/525, DIG. 58

(56) References Cited

U.S. PATENT DOCUMENTS

| | | | | |
|---|---|---|---|---|
| 3,050,773 A | * | 8/1962 | Hagen ........................ | 264/534 |
| 4,266,927 A | * | 5/1981 | Gilbert et al. ............... | 264/534 |
| 5,227,114 A | * | 7/1993 | Moore ......................... | 264/534 |
| 5,271,650 A | | 12/1993 | Fukuhara et al. | |
| 5,498,045 A | | 3/1996 | Morgan et al. | |
| 5,658,027 A | | 8/1997 | Eissinger et al. | |

FOREIGN PATENT DOCUMENTS

| | | | | |
|---|---|---|---|---|
| JP | 52-40575 | * | 3/1977 | .................. 264/531 |
| JP | 56-095649 | * | 8/1981 | .................. 264/531 |
| JP | 61-29524 | * | 2/1986 | .................. 264/534 |

* cited by examiner

Primary Examiner—Suzanne E. McDowell
(74) Attorney, Agent, or Firm—Larry I. Shelton

(57) ABSTRACT

The present invention provides a wholly blow molded light weight bumper system which provides a double walled vertical blow rib for mounting the bumper to a vehicle and a method for making the same. A first surface projects from one of the molds and is perpendicular to the first and second mold halves. In association with the first surface a second surface is movable between a retracted position and an extended position. To create the vertical rib the second surface is moved from the retracted position to the extended position. The second surface thereby pinching the inflated thermoplastic material between the first surface creating a double walled vertical rib substantially perpendicular to the parting line.

8 Claims, 2 Drawing Sheets

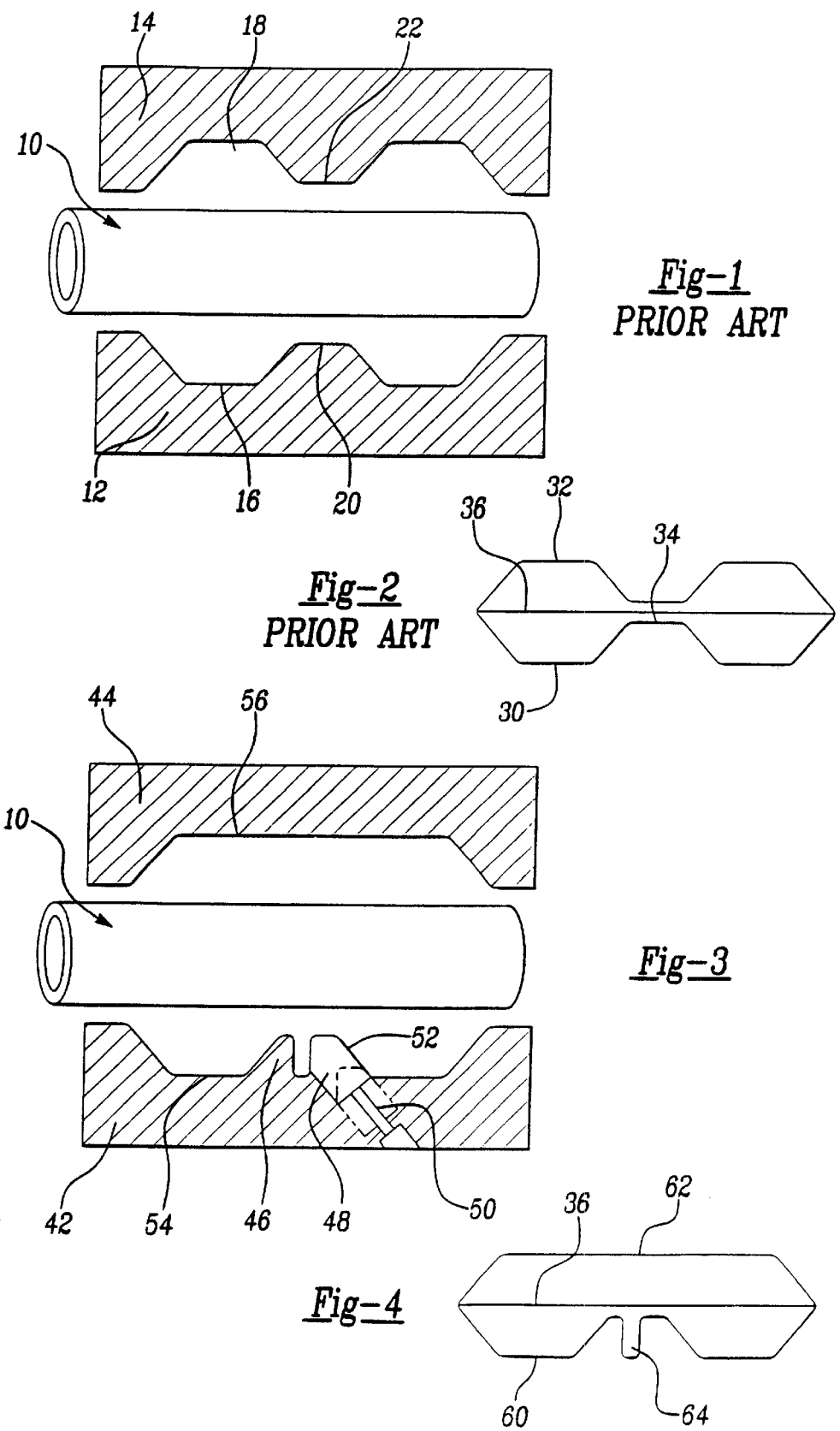

METHOD OF BLOW MOLDING AN ARTICLE HAVING BLOW MOLDED VERTICAL REINFORCEMENT RIBS

BACKGROUND OF THE INVENTION

1. Field of the Invention

The present invention relates to a blow molded article and the method of making same. More particularly, the present invention is concerned with forming double wall reinforced vertical ribs into a blow molded vehicle bumper.

2. Description of the Related Art

It is known to manufacture lightweight bumpers from blow molded plastic material. However, current blow molded bumpers suffer the drawback of lacking effective blow molded structure for attachment of the bumper body to a vehicle frame member. Conventional blow molded bumpers generally include a series of fastening studs or bolts which are either molded into or surround the plastic. These studs are then used to affix the bumper to the vehicle frame. However, studs or bolts are difficult to incorporate into the mold and tend to pull away from the plastic material under relatively low tensile loads. The incorporation of stud plates or blind fasteners have only partially cured the mounting problem while adding undesirable weight and complexity to the bumper system.

Other bumper systems provide for molding structural members within the bumper body. An example of such a system is U.S. Pat. No. 5,271,650, which teaches a method of blow molding a bumper system having metal attaching members integrally molded therein. The attaching member is generally made of sheet metal and serves to affix the bumper to the vehicle. However, the integral molding of metal frame members requires a multiple step molding process. The mold cavity must first locate the attaching members and associated hardware prior to the actual blow molding process. These attaching members add undesirable weight and expense while defeating the simplicity of a wholly blow molded bumper.

It is therefore desirable to manufacture a wholly blow molded light weight bumper system which provides reinforced blow molded structure which adds to the overall rigidity of the bumper system. It is further desirable to manufacture a light weight bumper system which provides reinforced blow molded structure for mounting to a vehicle. It is still further desirable to manufacture a light weight blow molded bumper system which eliminates the use of blind fasteners while providing the opportunity to hide the vehicle mounting components within the bumper

SUMMARY OF THE INVENTION

Responsive to the disadvantages of the prior art, the present invention provides a wholly blow molded light weight bumper system providing double wall reinforced vertical ribs.

According to one embodiment of the present invention, a blow molded vehicle bumper system is disclosed. The blow molded vehicle bumper having a vertical reinforcement rib for attachment of the bumper to a vehicle frame member extending from a vehicle. The bumper extending substantially across the width of the vehicle and having a front side facing away from the vehicle and a back side facing toward the vehicle.

The blow molded bumper body formed of thermoplastic material providing a substantially uniform wall thickness and having a substantially horizontal parting line extending substantially across the length of the bumper. A recessed portion formed into the bumper backside and being defined by a substantially horizontal top portion and a substantially horizontal bottom portion. The vertical rib integrally formed into the recessed portion and joining the top portion and bottom portion The vertical rib having a reinforced double wall thickness of thermoplastic material pinched together and projecting toward the vehicle and oriented substantially perpendicular to the parting line.

The vertical reinforcement rib comprises thermoplastic material pinched together. When the thermoplastic material is pinched between a first surface and a second surface the material is folded over itself creating a double wall of thermoplastic material. Compressing the material between the surfaces aids the fusing of the material layers and the forming of a double-wall strong vertical reinforcement rib.

The present invention further teaches a method of blow molding a vehicle bumper having ribs perpendicular to the parting line. A mold apparatus is provided having first and second molds defining an interior surface. A first surface projects from one of the molds and is perpendicular to the first and second molds. In association with the first surface a second surface is movable between a retracted position and an extended position. The second surface extends toward the first surface during extension and away from the first surface during retraction. Extruding a thermoplastic parison substantially between the first and second molds when the mold is in the open position and then closing the molding apparatus and containing the parison between the first and second molds. The parison is then inflated until the parison contacts the mold interior surface. The first surface is then extended from the retracted position and the thermoplastic parison is pinched therebetween. The pinching thereby forming a rib generally perpendicular to the first and second molds. The first surface is then retracted to release the rib formed in the extending step. Finally, the molding apparatus is opened and the article is released.

In another embodiment of the present invention both the first and second surface are movable to pinch the thermoplastic material between the first and second surfaces to create a double wall reinforced rib perpendicular to the first and second mold halves.

Accordingly, an object of the present invention is to provide integral mounting structure which adds to the overall rigidity of a bumper system. An advantage of the present invention is the use of blow molded vertical ribs to create a cross-brace perpendicular to the parting line thereby operating as an "I" beam like structural member. The vertical rib either alone or in multiples are therefore operable as integral structural members to readily mount and support the bumper body on a vehicle frame member.

These and other desired objects and advantages of the present invention will become more apparent in the course of the following detailed description and appended claims. The present invention may best be understood with reference to the accompanying drawings wherein illustrative embodiments are shown.

BRIEF DESCRIPTION OF THE DRAWINGS

FIG. 1 is a cross-sectional view of a prior art blow molding apparatus;

FIG. 2 is a cross-section view of a simplified blow molded part having a representative horizontal rib produced by the prior art blow molding apparatus of FIG. 1;

FIG. 3 is a cross-sectional view of a blow molding apparatus of the instant invention;

FIG. 4 is a cross-section view of a simplified blow molded part having a representative vertical rib produced by the blow molding apparatus of FIG. 3.

DETAILED DESCRIPTION OF THE PREFERRED EMBODIMENTS

Figure 5:
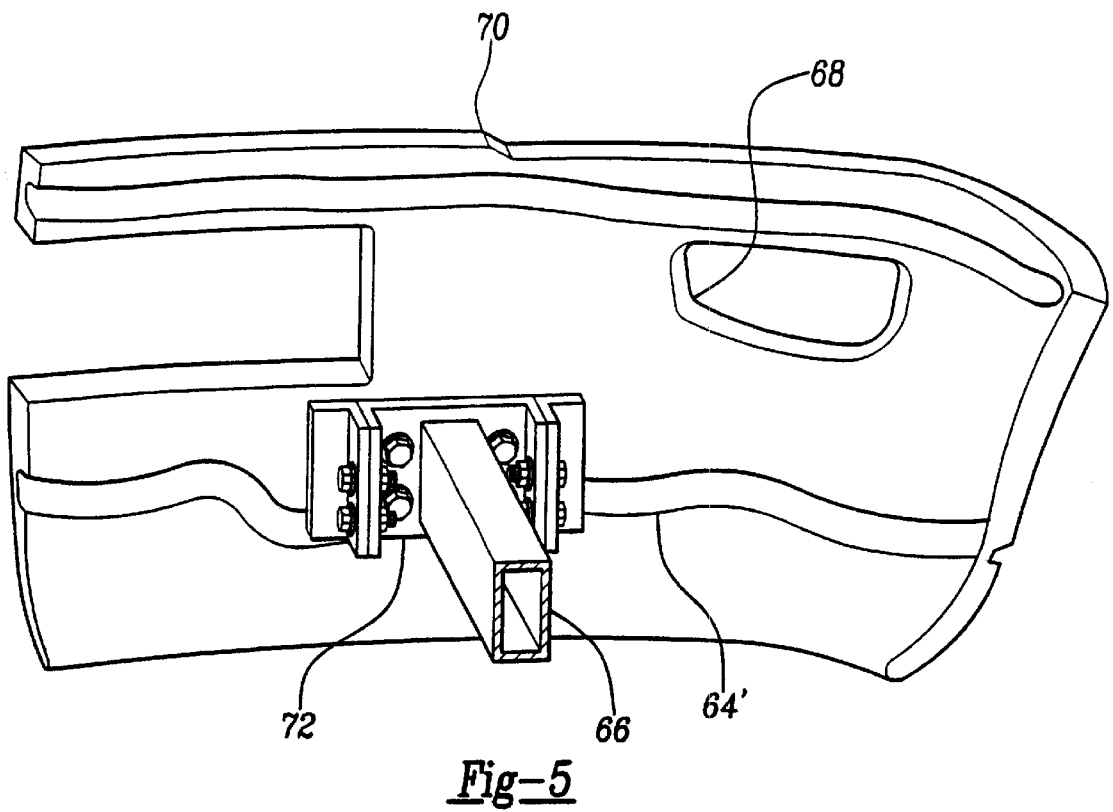
FIG. 5 is representative section of a vehicle bumper showing the reinforced vertical ribs produced by the blow molding apparatus of the instant invention.

The present invention will be described through a series of drawings, which illustrate a blow molded vehicle bumper having blow molding vertical ribs and a method for making same. The following items are a word list of the items described in the drawings and are reproduced to aid in understanding the invention:

| | |
|---|---|
| 10, 10' | parison |
| 12, 14 | molds |
| 16, 18 | mold interior surface |
| 20, 22 | conventional mold form |
| 30, 32 | external surfaces |
| 34 | horizontal rib |
| 36, 36' | horizontal parting line |
| 42 | first mold |
| 44 | second mold |
| 46 | first surface |
| 48 | second surface |
| 50 | second surface retracted position |
| 52 | second surface extended position |
| 54, 56 | interior surfaces |
| 60, 62 | external surfaces |
| 64 | vertical double-wall reinforced rib |
| 66 | frame member |
| 68 | recessed portion |
| 70 | top portion |
| 72 | bottom portion |

The prior art and the present invention will be described through a series of drawings, which illustrate the blow molded bumper of the present invention. Referring to FIG. 1, there is shown a cross-sectional view of a prior art blow molding apparatus. A hot pliable thermoplastic parison 10 is located between matched molds 12,14. The molds 12,14 include a conventional mold form 20,22 which allow the blow molding of a horizontal rib 34 substantially parallel to a horizontal parting line 36. As shown in FIG. 2, the parting line 36 is formed from the closing of the molds 12,14 and the inflation of the parison 10 therein.

FIG. 2 is a cross-section view of a simplified prior art blow molded article having a representative horizontal rib 34. The parison 10 is inflated until it contacts with the mold interior surfaces 16,18 and forms the external surfaces 30,32, and the horizontal rib 34 of the final blow molded article. As shown by this view the horizontal rib 34 is substantially parallel to the parting line 36. The unreinforced horizontal rib 34 thereby fails to operate as a structural member and does not increase the overall rigidity of the bumper system.

Referring to FIG. 3, there is shown a cross-sectional view of a blow molding apparatus of the instant invention. A hot pliable thermoplastic parison 10' is located between matched molds 42,44. As shown in FIG. 4, the parting line 36' is again formed from the closing of the molds 42,44 and the inflation of the parison 10' therein. The parison 10' expands to the mold interior surfaces 54,56 and forms the external surfaces 60,62 of the final blow molded article of FIG. 4.

FIG. 3 further shows a first surface 46 which projects from one of the molds and is perpendicular to the first 42 and second molds 44. In association with the first surface 46 a second surface 48 is movable between a retracted position 50 and an extended position 52. The second surface 48 moves toward the first surface 46 during extension 52 and away from the first surface 48 during retraction 50. A parison 10' of thermoplastic material is placed substantially between the first 42 and second molds 44. The molds 42,44 are closed over the parison 10' to create a closed mold. The blow molded part is then inflated within the closed mold.

To create a vertical rib 36 substantially perpendicular to the mold line 34' as shown in FIG. 4, the second surface 48 is moved from the retracted position 50 to the extended position 52. The second surface 48 pinches the inflated thermoplastic material between the first surface 48 and the second surface 46 thereby creating a double wall vertical rib 64 substantially perpendicular to said first mold 42, second mold 44 and the resulting parting line 36. The present invention further provides the advantage of exerting force upon the still pliable thermoplastic material between the first surface 46 and second surface 48 to assure a double wall vertical rib 64 in which the walls of the thermoplastic material are fused together.

FIG. 4 is a cross-section view of a simplified blow molded part having a representative double wall vertical rib 64. As shown by this view the vertical rib 64 creates a cross-brace perpendicular to the parting line 36' thereby operating as a structural member which adds to the overall rigidity of the bumper system.

Another embodiment of the present invention provides for a plurality of moving surfaces. The surfaces are movable to pinch the inflated thermoplastic material between a first movable surface and a second movable surface thereby creating a double wall vertical rib substantially perpendicular to said first mold, second mold and the resulting parting line. Although the surfaces are illustrated as slidably moving from a retracted position to an extended position, it should be understood that the present invention is suitable to any movement which pinches the parison, and is not limited only to such slidable movement.

FIG. 5 is a representative section of a vehicle bumper showing parallel double wall vertical ribs 64 bolted to a frame member 66 used to support and attach the vehicle bumper. Additionally, the vehicle bumper provides at least one recessed portion 68 formed therein. The recessed portion 68 being defined by a substantially horizontal top portion 70 and a substantially horizontal bottom portion 72 with the double wall vertical rib 64 therebetween. The relationship creating a rigid "I" beam like support system for attachment to a vehicle frame member 66. As shown, the frame member 66 may have the mounting hardware recessed and hidden within the bumper backside.

FIG. 5 further displays the ability to use a plurality of first surfaces 48 and second surfaces 46 to create multiple double wall sections fused into uniform vertical ribs 64' to provide secure supports for the attachment of variously shaped frame members while adding to the rigidity of the overall bumper system.

It is thus seen that the objects of this invention have been fully and effectively accomplished. It will be realized, however, that the foregoing preferred embodiments have been shown and described for the purpose of illustrating the functional and structural principles of this invention and are subject to change and modification by those skilled in the art without departing from the principles described. Therefore, this invention includes all modifications encompassed within the spirit and scope of the following claims:

What is claimed:

1. A method of blow molding an article having a rib in a molding apparatus having open and closed positions and first and second molds defining first and second interior surfaces, said first interior surface having a first surface perpendicular to said first interior surface and extending inwardly toward said second interior surface defining a recessed portion of said first interior surface, and a second surface movable between a retracted position and an extended position, and when said second surface is in said extended position said second surface being perpendicular to said first interior surface and extending inwardly toward said second interior surface, said second surface moving toward said first surface while extending and moving away from said first surface while retracting, said method comprising the steps of:

extruding a thermoplastic parison substantially between said first and second molds when in said open position;

closing said molding apparatus and containing said parison between said first and second molds;

inflating said parison and contacting said parison with said first and second interior surfaces;

extending said second surface from said retracted position to said extended position, in said extended position said second surface being perpendicular to said first interior surface and extending inwardly toward said second interior surface, said first and second surfaces pinching said thermoplastic parison therebetween and forming said rib generally perpendicular to said first interior surface and extending from said recessed portion toward said first interior surface;

retracting said second surface to release said rib formed in said extending step; and opening said molding apparatus.

2. A method as described in claim 1, wherein said rib comprises a double wall of thermoplastic material.

3. A method as described in claim 2, wherein said double wall of thermoplastic material is fused together.

4. A method as described in claim 1, further comprising a plurality of said first and second surfaces, said second surfaces moving from said retracted positions to said extended positions pinching said thermoplastic parison between said first surfaces and said second surfaces and forming a plurality of ribs generally perpendicular to said first and second molds.

5. A method of blow molding an article in a molding apparatus having open and closed positions and first and second molds defining first and second interior surfaces, said first mold having first and second surfaces movable between retracted and extended positions, when in said extended positions said first and second surfaces being perpendicular to said first interior surface and extending inwardly toward said second interior surface and defining a recessed portion, said method comprising the steps of:

said first surface moving toward said second surface during extension and away from said second surface during retraction;

said second surface moving towards said first surface during extension and away from said first surface during retraction;

extruding a thermoplastic parison substantially between said first and said second molds when in said open position;

closing said molding apparatus and containing said parison between said first and second molds;

inflating said parison and contacting said parison with said first and second interior surfaces;

extending said first and second surfaces from said retracted positions, in said extended positions said first and second surfaces being perpendicular to said first interior surface and extending inwardly toward said second interior surface, said first and second surfaces pinching said thermoplastic parison therebetween forming a rib generally perpendicular to said first interior surface and extending from said recessed portion toward said first interior surface;

retracting said first and second surfaces to release said rib formed in said extending step; and opening said molding apparatus.

6. A method as described in claim 5, wherein said rib comprises a double wall of thermoplastic material.

7. A method as described in claim 6, wherein said double wall of thermoplastic material is fused together.

8. A method as described in claim 7, further comprising a plurality of said first and second surfaces, said first and second surfaces moving from said retracted positions to said extended positions and pinching said thermoplastic parison between said first and second surfaces and forming a plurality of ribs generally perpendicular to said first and second molds.

* * * * *